(12) United States Patent
Kubik et al.

(10) Patent No.: US 10,864,986 B2
(45) Date of Patent: Dec. 15, 2020

(54) AERIAL VEHICLE INCLUDING AUTONOMOUS ROTOR SPEED CONTROL

(71) Applicant: Sikorsky Aircraft Corporation, Stratford, CT (US)

(72) Inventors: Stephen Kubik, Shelton, CT (US); Derek Geiger, Wilton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 590 days.

(21) Appl. No.: 15/559,351

(22) PCT Filed: Mar. 18, 2016

(86) PCT No.: PCT/US2016/023040
§ 371 (c)(1),
(2) Date: Sep. 18, 2017

(87) PCT Pub. No.: WO2016/200457
PCT Pub. Date: Dec. 15, 2016

(65) Prior Publication Data
US 2018/0257770 A1 Sep. 13, 2018

Related U.S. Application Data
(60) Provisional application No. 62/136,775, filed on Mar. 23, 2015.

(51) Int. Cl.
*B64C 27/57* (2006.01)
*B64D 31/06* (2006.01)
(52) U.S. Cl.
CPC .............. *B64C 27/57* (2013.01); *B64D 31/06* (2013.01)

(58) Field of Classification Search
CPC ................................ B64C 27/57; B64D 31/06
See application file for complete search history.

(56) References Cited

U.S. PATENT DOCUMENTS 4,488,236 A * 12/1984 Morrison .................. F02C 9/28
244/182
7,438,259 B1 * 10/2008 Piasecki .................. B64C 27/26
244/6
(Continued)

FOREIGN PATENT DOCUMENTS

WO 2005100154 A1 10/2005

OTHER PUBLICATIONS

PCT International Search Report; International Application No. PCT/US 16/23040; International Filing Date: Mar. 18, 2016; dated Nov. 29, 2016, pp. 1-8.
(Continued)

*Primary Examiner* — Philip J Bonzell
*Assistant Examiner* — Michael B. Kreiner
(74) *Attorney, Agent, or Firm* — Foley & Lardner LLP (57) ABSTRACT

A rotary aerial vehicle (AV) includes an engine configured to rotate at least one rotor at a variable rotor speed, a full authority electronic microcontroller (FAEM) in electrical communication with the engine. The FAEM is configured to output at least one electronic engine control signal that controls operation of the engine. An electronic rotor speed microcontroller (ERSM) is in electrical communication with the FAEM, and the ERSM is configured to dynamically determine at least one mission objective of the rotary AV, and outputs an electronic rotor speed control signal that commands the FAEM to adjust the rotor speed of the at least one rotor.

12 Claims, 8 Drawing Sheets

(56) References Cited

U.S. PATENT DOCUMENTS

| | | |
|---|---|---|
| 2010/0198514 A1 | 8/2010 | Miralles |
| 2012/0143482 A1 | 6/2012 | Goossen et al. |
| 2013/0206899 A1 | 8/2013 | Sahasrabudhe et al. |
| 2014/0166817 A1 | 6/2014 | Levien et al. |
| 2014/0249693 A1 | 9/2014 | Stark et al. |

OTHER PUBLICATIONS

PCT ISR Written Opinion; International Application No. PCT/US 2016/23040; International Filing Date Mar. 18, 2016, dated Nov. 29, 2016, pp. 1-4.

\* cited by examiner

AERIAL VEHICLE INCLUDING AUTONOMOUS ROTOR SPEED CONTROL

CROSS REFERENCE TO RELATED APPLICATIONS

This application is a National Stage application of PCT/US2016/023040, filed Mar. 18, 2016, which claims the benefit of U.S. Provisional Patent Application No. 62/136,775, filed Mar. 23, 2015, both of which are incorporated by reference in their entirety herein.

TECHNICAL FIELD

The present invention relates generally to rotary aerial vehicles (AVs), and more specifically, to rotary AVs including active rotor blades.

BACKGROUND

Recent trends in rotary aircraft have led to the implementation of active rotor speed manipulation to accommodate high speed flight. The flexibility to manage the rotor speed, e.g., main rotor speed (Nr) of a rotary aircraft is desirable to manage rotor blade tip Mach number from entering the supersonic regime. In addition, the ability to control the variation of rotor speed can affect noise abatement, fuel flow management, and overall performance of the aircraft. Rotor speed control has been traditionally managed in terms of a pilot input to the engine Full Authority Digital Engine Control (FADEC). For example, a pilot of a rotary aircraft subjectively manages and operates a power control lever while the engine FADEC maintains the corresponding main rotor speed. Recent trends, however, have turned to unmanned aerial vehicles (UAVs) or optionally piloted vehicles (OPVs) to execute various mission objectives traditionally reserved for manual aircraft operation. Moreover, recent advances in autonomous technology have eliminated much of the UAV control previously reserved for UAV remote pilots.

SUMMARY

According to an embodiment, an rotary aerial vehicle (AV) includes an engine configured to rotate at least one rotor at a variable rotor speed, a full authority electronic microcontroller (FAEM) in electrical communication with the engine, the FAEM configured to output at least one electronic engine control signal that controls operation of the engine, and an electronic rotor speed microcontroller (ERSM) in electrical communication with the FAEM, the ERSM configured to dynamically determine at least one mission objective of the rotary AV and to output an electronic rotor speed control signal that commands the FAEM to adjust the rotor speed of the at least one rotor.

In addition to one or more of the features described above or below, or as an alternative, further embodiments include:

a feature, where the ERSM includes an electronic mission executor unit that is configured to determine a mission objective in response to at least one selected operating mode of the rotary AV;

a feature, where the at least one selected operating mode includes a velocity capture mode, a penetration velocity mode, a best range mode, a loiter mode, a stealth mode, an aggressive max-speed mode, and a minimum fuel consumption mode;

a feature, where the electronic mission executor unit stores at least one rotor speed schedule that corresponds to the determined mission objective, and selects the at least one rotor speed schedule in response to determining the mission objective;

a feature, where the electronic mission executor unit calculates a reference rotor speed based on the at least one selected rotor speed schedule;

a feature, where the electronic rotor speed control signal indicates the reference rotor speed, and the FAEM commands the engine to rotate the at least one rotor at the reference rotor speed in response to receiving the electronic rotor speed control signal; and a feature, where the ERSM further includes an electronic dynamic navigation unit in electrical communication with the electronic mission executor unit, wherein the dynamic navigation unit is configured to generate a flight path of the rotary AV, and wherein the mission executor is configured to calculate at least one reference rotor speed based on the flight path.

According to another embodiment, a method of controlling a rotor speed of a rotary AV comprises rotating at least one rotor at a variable rotor speed, outputting at least one electronic engine control signal that controls operation of the engine, and dynamically determining at least one mission objective of the rotary AV and outputting an electronic rotor speed control signal that adjusts the rotor speed of the at least one rotor.

In addition to one or more of the features described above or below, or as an alternative, further embodiments include:

a feature of determining a mission objective in response to at least one selected operating mode of the rotary AV, wherein the at least one selected operating mode includes a velocity capture mode, a penetration velocity mode, a best range mode, a loiter mode, a stealth mode, an aggressive max-speed mode, and a minimum fuel consumption mode;

a feature of storing in an electronic memory unit at least one rotor speed schedule that corresponds to the determined mission objective, and selecting the at least one rotor speed schedule in response to determining the mission objective;

a feature of calculating a reference rotor speed based on the at least one selected rotor speed schedule, wherein the electronic rotor speed control signal indicates the reference rotor speed, and commanding the engine to rotate the at least one rotor at the reference rotor speed based on the electronic rotor speed control signal;

a feature of generating a flight path of the rotary AV, and calculating at least one reference rotor speed based on the flight path; and a feature of assigning the at least one reference rotor speed to at least one way point included in the flight path, wherein the rotary AV autonomously changes a rotor speed from a first rotor speed to a second rotor speed that matches the reference rotor speed in response to reaching that at least one waypoint.

Various non-limiting embodiments of the invention provide one or more technical effects, including but not limited to, a rotary AV such as a UAV or OPV, for example, capable of actively controlling the main rotor speed. In this manner, the rotary AV is capable of automatically selecting the most appropriate main rotor speed based on various active parameters including, but not limited to, the desired mission objective, the terrain, and the fuel supply. Moreover, the ability for the rotary AV to vary the rotor speed (Nr) offers a capability to provide quiet operation, increase fuel efficiency, and improve maneuverability.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Various embodiments allow for actively commanding the main rotor speed of a rotary aerial vehicle (AV) including, but not limited to, an unmanned aerial vehicle (UAV) or a rotary optionally piloted vehicle (OPV). At least one non-limiting embodiment provides a rotary AV including an electronic rotor speed control microcontroller that incorporates main rotor speed with information propagated across the rotary AV control system. In this manner, the electronic rotor speed control microcontroller is capable of automatically selecting the most appropriate main rotor speed based on various active parameters including, but not limited to, the desired mission objective, terrain, and fuel supply. As a result, control laws, flight path, and rotary AV control commands can be supplied which satisfy current aircraft limitations. Moreover, the ability to vary the main rotor speed offers the capability to provide quiet operation, increased fuel efficiency, and improved maneuverability. These capabilities can be exercised in conjunction with reducing main rotor speed to enable high speed operation with the rotary AV control system's degree of freedom.

Figure 1:
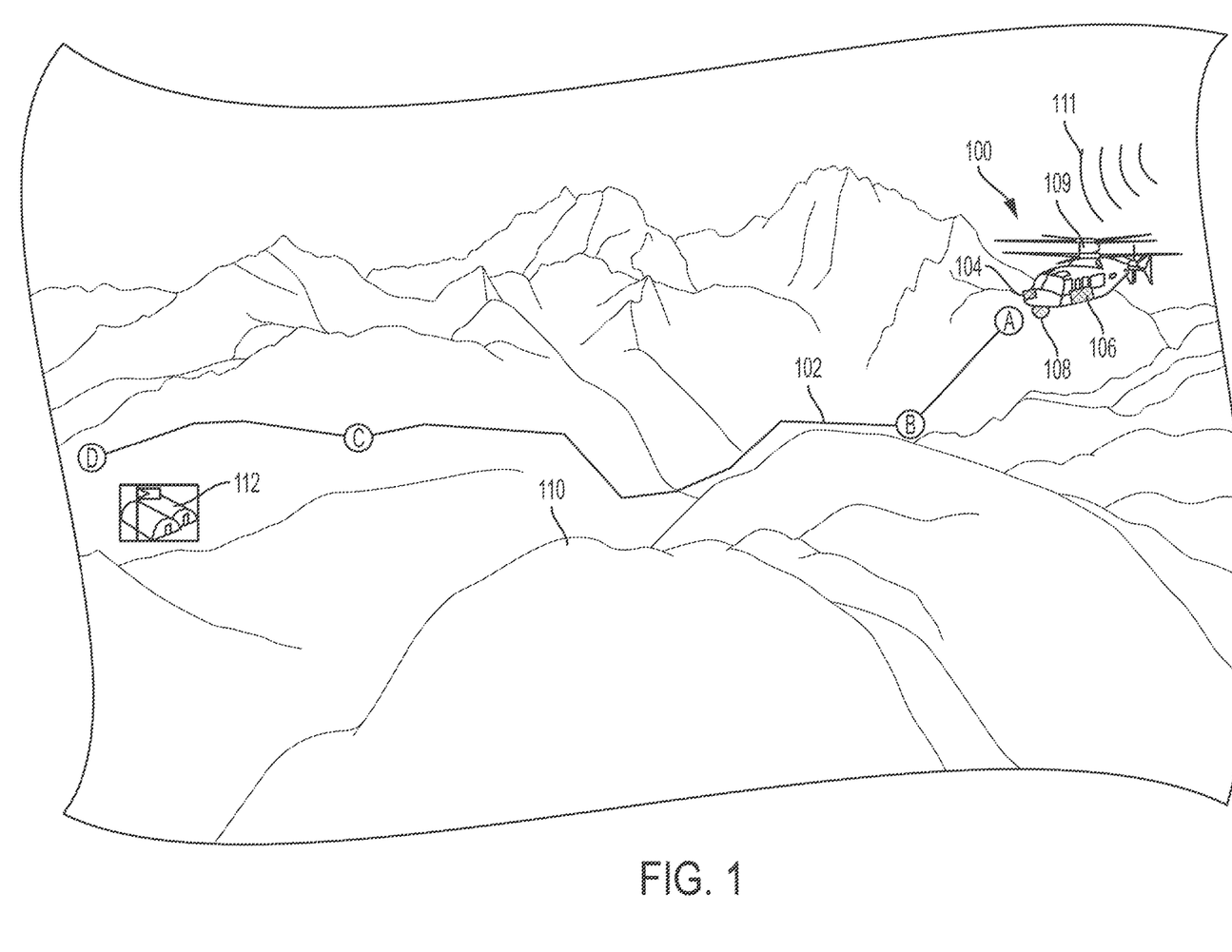
FIG. 1 illustrates a rotary AV including an electronic rotor speed control microcontroller configured to autonomously control a rotor speed of the rotary AV while navigating various waypoints of a mission objective according to a non-limiting embodiment.
Figure 2A:
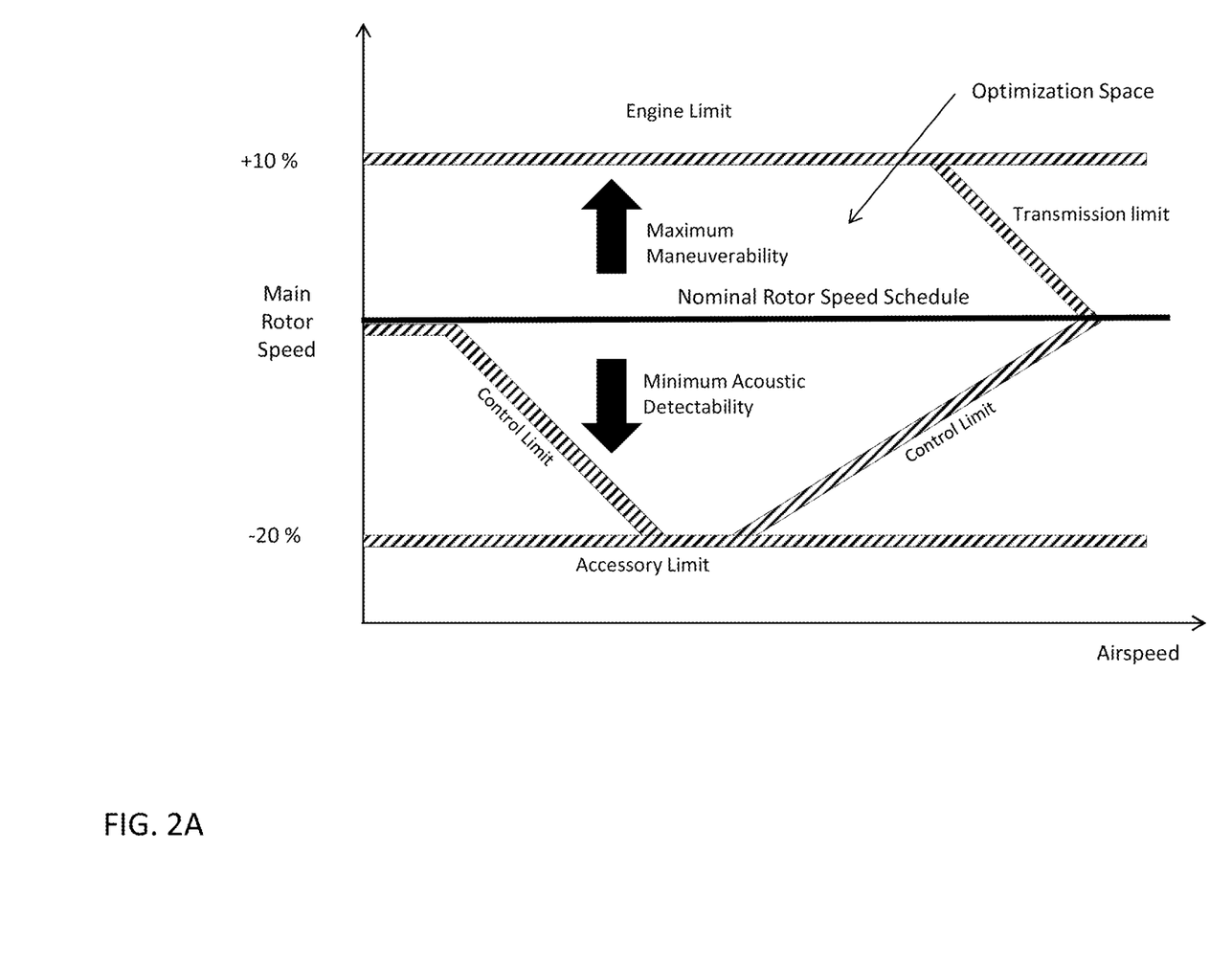
FIGS. 2A-2D are line graphs illustrating main rotor speed (Nr) schedules generated by the electronic rotor speed control microcontroller included in the rotary AV according to a non-limiting embodiment.
Figure 2B:
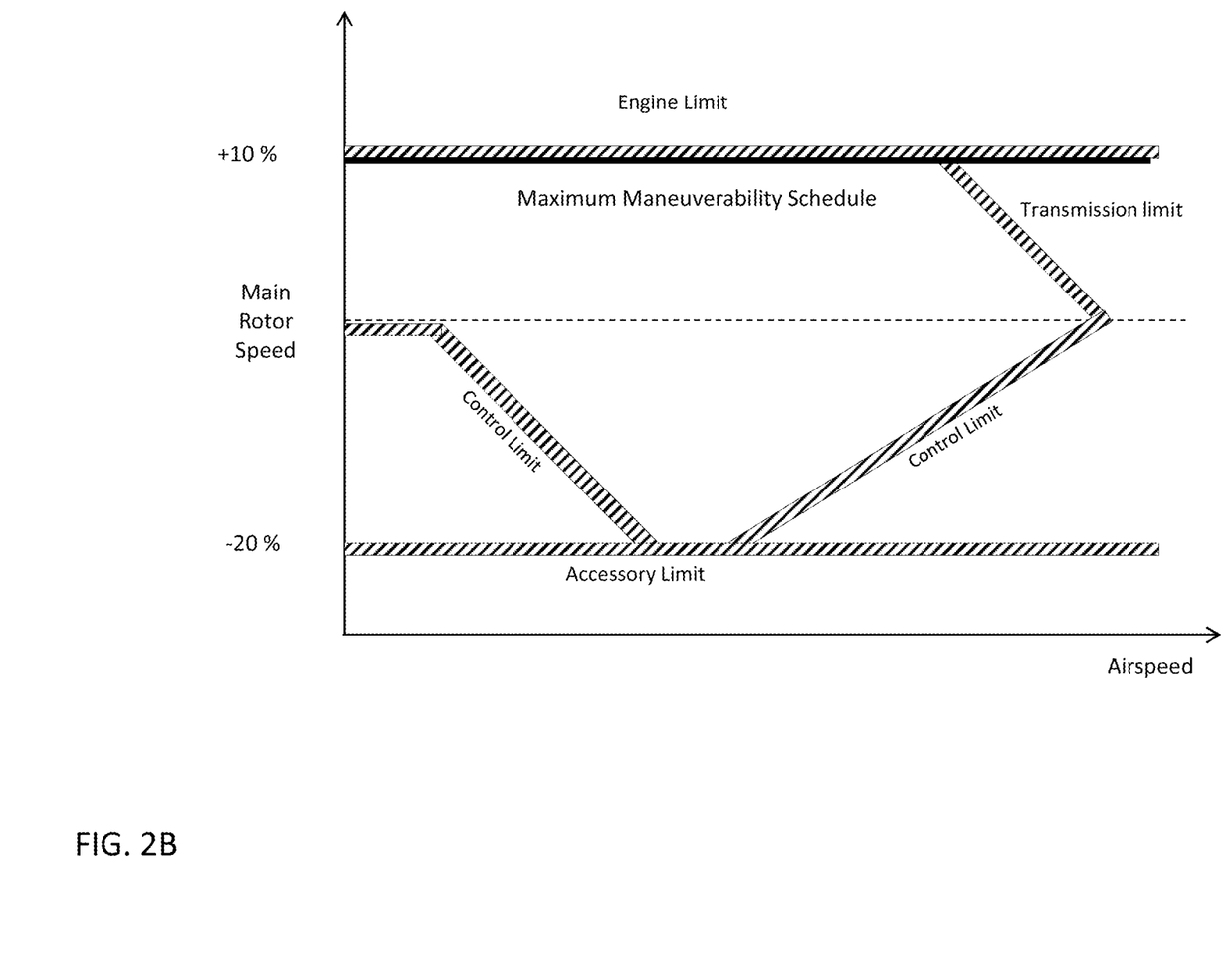
Figure 2C:
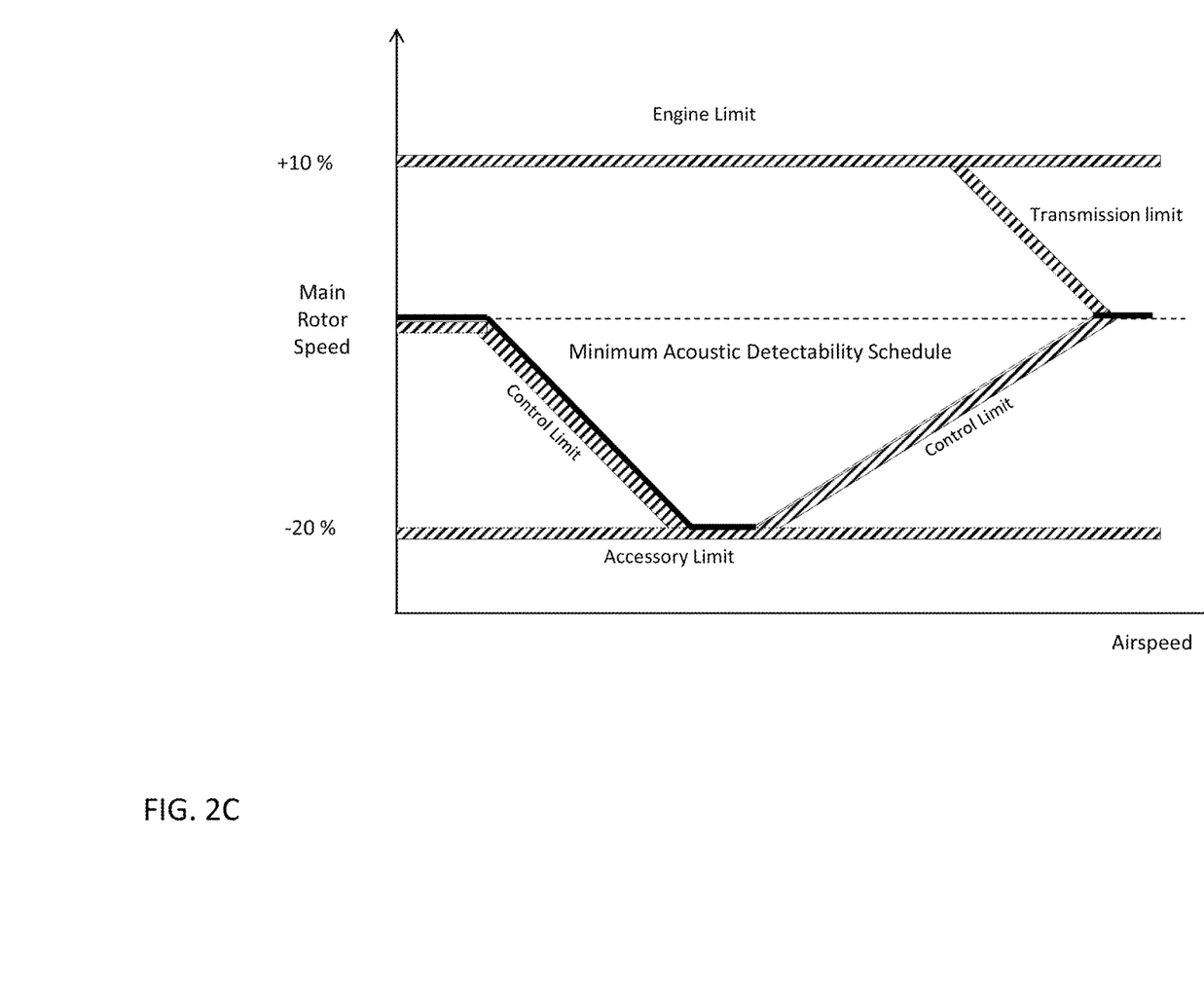
Figure 2D:
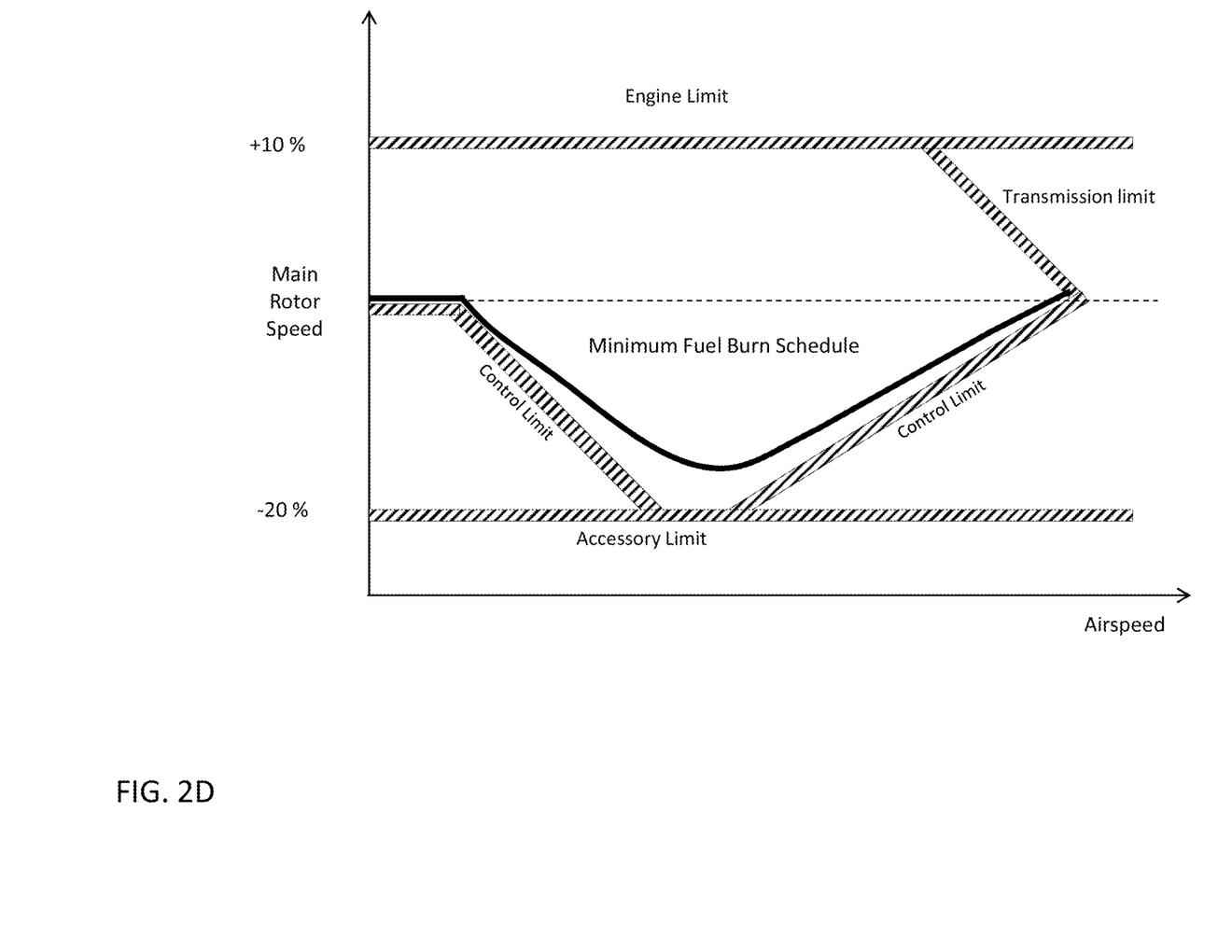

Turning now to FIG. 1, a rotary AV 100, such as a rotary UAV or rotary OPV, is illustrated travelling along a flight path 102 according to a non-limiting embodiment. The rotary AV 100 includes a full authority electronic microcontroller (FAEM) 104, an electronic rotor speed microcontroller (ERSM) 106, and one or more image sensors 108. The FAEM 104 is an electronic system comprising a digital computer or digital electronic control unit that dynamically controls all aspects of the rotary AV's engine performance and flight controls. According to an embodiment, the (FAEM) outputs one or more electronic engine control signals that controls operation of the ROTARY AV engine, and thus the rotor 109.

The ERSM 106 is a digital computer or electronic control unit configured to actively control the main rotor speed (Nr) of at least one rotor 109 of the ROTARY AV 100 based on various inputs. The inputs include, but are not limited to, wireless data 111 sent via a transmitter located remotely from the ROTARY AV 100, the flight path 102, one or more mission objectives, and one or more various obstacles 110. The various obstacles 110 include, for example, mountains, buildings, terrain, woodlands etc. The various obstacles 110 can be identified via one or more image sensors 108 installed on the ROTARY AV 100, a pre-determined flight path 102 provided by the wireless data 111, and/or stored world models/maps stored in the ROTARY AV 100. According to an embodiment, the ERSM 106 is in electrical communication with the FAEM, and is configured to dynamically determine at least one mission objective of the ROTARY AV. Based on the mission objective, an Nr schedule can be determined and the ERSM 106 outputs an electronic rotor speed control signal that commands the FAEM to adjust the main rotor speed of the rotor 109. Therefore, the ROTARY AV 100 can dynamically control the main rotor speed (Nr) while actively executing a mission objective.

Referring further to FIG. 1, the ROTARY AV 100 begins at waypoint A and proceeds to waypoint B where an obstacle is known to exist. In turn, the ROTARY AV 100 can dynamically adjust the main rotor speed (Nr) in order to improve maneuverability for maneuvering around the obstacle. The ROTARY AV 100 then autonomously continues to waypoint C, at which time the ROTARY AV 100 identifies a target 112. If the mission objective input to the ROTARY AV 100 is a clandestine mission or stealth mission, the ROTARY AV 100 may further dynamically control the main rotor speed (Nr), i.e., lower the main rotor speed (Nr), in order to reduce noise and vibration to remain undetected. From waypoint C, the ROTARY AV 100 continues in a stealth mode where it may perform reconnaissance operations, attack operations, extraction support, or other operations before completing the flight path at waypoint D. Accordingly, the ERSM 106 is capable of automatically selecting the most optimal main rotor speed (Nr) (i.e., Nr schedule) based on various active parameters including, but not limited to, the desired mission objective, the terrain, and one or more identified targets.

Turning to FIGS. 2A-2D, line graphs illustrate the main rotor speed (Nr) schedules generated by the ERSM 106 according to a non-limiting embodiment. The line graph in FIG. 2A, for example, overlays a nominal main rotor speed (Nr) schedule with respect to various limits of the ROTARY AV 100. As further illustrated in FIG. 2A, the main rotor speed (Nr) has a direct opposite correlation with respect to maneuverability, acoustic detectability, and fuel consumption. For example, maximum maneuverability is achieved at approximately 10% (+10%) above nominal Nr, for example, while the minimum acoustic detectability of the ROTARY AV 100 is achieved at approximately 20% (−20%) below nominal Nr. Therefore when travelling at maximum maneuverability, i.e., at 10% above Nr (see FIG. 2B), the ROTARY AV 100 is susceptible to high noise output. On the other hand, as the main rotor speed (Nr) is gradually reduced to approximately 20% below nominal Nr (see FIG. 2C), maneuverability decreases while minimum acoustic detectability increases, i.e., the noise output of the ROTARY AV 100 is reduced. Further, as the main rotor speed (Nr) is reduced to some margin below the nominal Nr (see FIG. 2D), fuel consumption is also reduced. The minimum fuel burn operating state is one where the required main rotor speed and collective blade pitch balance to generate only the required thrust to counteract aircraft weight. The state differs from minimum acoustic detectability in that the main rotor speed is set to its lowest point, thus requiring higher collective blade pitch and, subsequently, greater aircraft drag.

Figure 3:
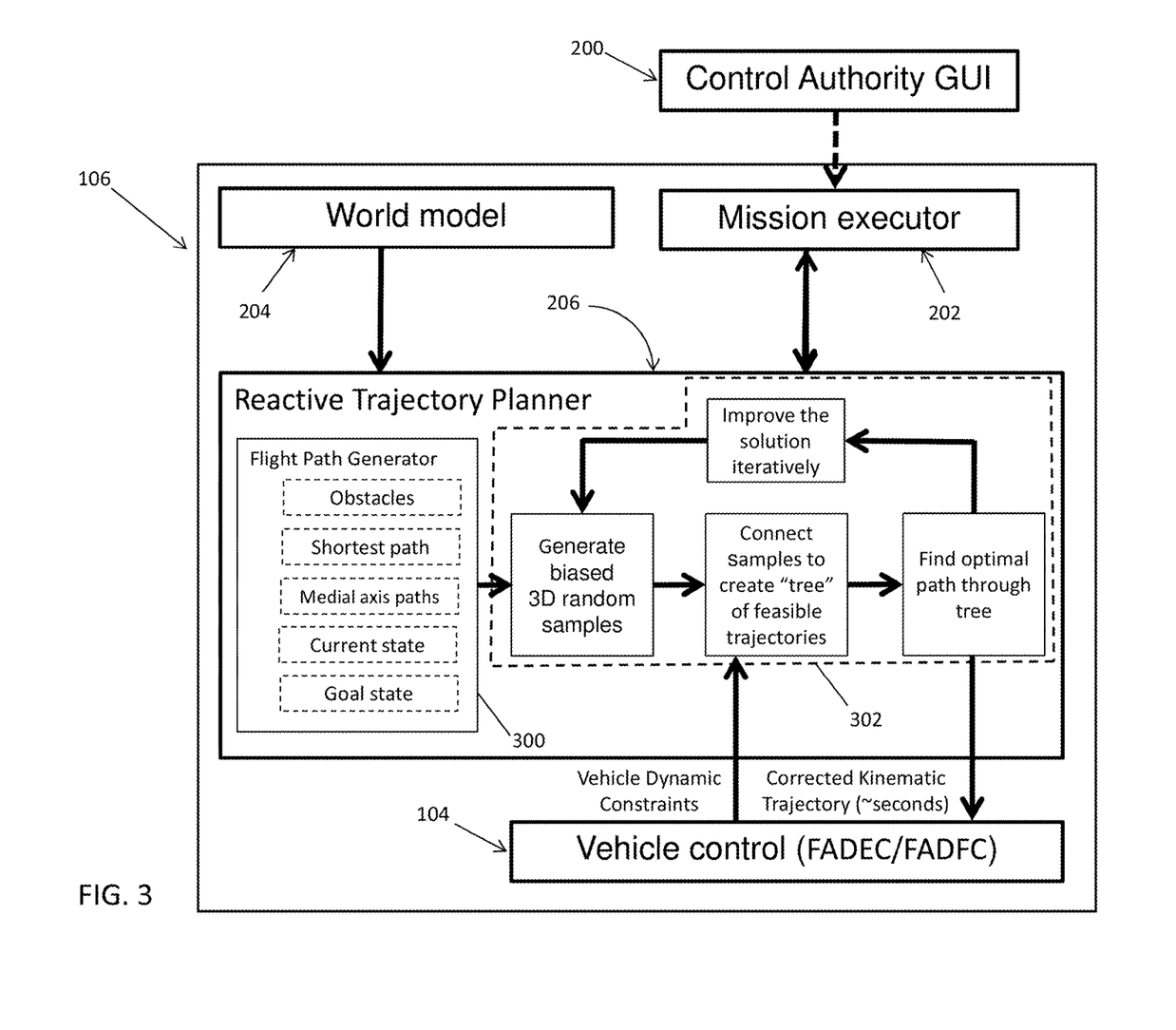
FIG. 3 is a block diagram of an electronic rotor speed microcontroller included in a rotary AV according to a non-limiting embodiment.

Turning now to FIG. 3, a block diagram of the ERSM 106 is illustrated according to a non-limiting embodiment. The ERSM 106 is in electrical communication with the FAEM 104 and a control authority graphic user interface 200 (hereinafter referred to as a control GUI 200). The ERSM 106 includes an electronic mission executor unit 202, an electronic world model unit 204, and an electronic reactive trajectory planner unit 206. The mission executor unit 202 is configured to translate high level mission objectives (loiter at point A) into waypoint driven paths that must maintain a status to see if the plan holds together or should be altered. For example, the mission executor 202 receives one or more inputs from the control GUI 200 indicating various mission objectives, and waypoint commands initiating one or more various objectives of the ROTARY AV 100 of the ROTARY AV 100. According to an embodiment, GUI 200 can dynamically input and/or display waypoints and perceived threats to define an objective.

The mission executor 202, or manual selection, can select from the available Nr schedules and propagate them through the system based on the objective as discussed in greater detail below. According to a non-limiting embodiment, the mission executor unit 202 utilizes the mission objectives to select a main rotor reference speed (Nr reference) schedule appropriate for the task segment. The Nr reference can be calculated using one or more exemplary main rotor speed (Nr) schedules described in detail above. Once Nr schedule is calculated, the Nr reference is continuously monitored with respect to one or more limits of the ROTARY AV 100. Accordingly, the ROTARY AV 100 can be operated according to a mission object and operating mode without exceeding ROTARY AV 100 operational limits, e.g., without exceeding tip mach number, etc. Details on the calculation of the Nr reference are described in greater detail below.

The world model unit 204 comprises an electronic memory unit that stores data corresponding to the world environment surrounding the ROTARY AV 100. The world model data includes, for example, one or more geographical maps or models of a real world surrounding. The models may include, for example, satellite images of geographical surroundings which indicate various terrain and/or buildings corresponding to GPS coordinates. The world model data may be pre-stored in the world model unit 204 and/or may be dynamically received via wireless data 111. In this manner, the ROTARY AV 100 my dynamically obtain flight path information and/or obstacle data (e.g., locations of obstacles) located in the current vicinity of ROTARY AV 100 and at future locations along a flight path.

The reactive trajectory planner unit 206 includes an electronic flight path generator 300 and an electronic dynamic navigation unit 302. The reactive trajectory planner unit 206 generates a flight path for the ROTARY AV 100 based on the reference Nr from the mission executor unit 202, and one or more maps or models from the world model unit 204. When generating the flight path, the flight path generator 300 takes into account various obstacles determined using the data from the world model unit 204, the current state/location of the ROTARY AV 100, the final/end location of the objection mission, one or more medial/nominal paths between the current location and the end location, and the shortest path between the current location and the end location. The flight path generator 300 then outputs the generated flight path to the dynamic navigation unit 302.

The dynamic navigation unit 302 randomly generates three-dimensional (3D) samples of the flight path and executes various algorithms to generate a tree diagram of various feasible trajectories corresponding to the flight path. From those trajectories between each set of waypoints, those paths which cannot be achieved within the vehicle kinematics are eliminated. It is during this process that the rotor speed and control constraints iterate to create a splined path that are within the air vehicle constraints at each time step. According to an embodiment, the dynamic navigation unit 302 can further execute one or more algorithms (e.g., graph search algorithms and evolutionary/genetic algorithms) to determine an optimal flight path among the trajectories. The dynamic navigation unit 302 communicates with the ERSM 106 to control flight parameters and engine speed in order to obtain the optimal flight path.

According to an embodiment, the optimal trajectory can be returned to the mission executor 202 for further analysis. The mission executor 202 may then identify obstacles, terrain and targets between the current location and the final destination and assign a different reference Nr at independent waypoints along the optimal trajectory as described above. For example, a first reference Nr can be assigned to a first waypoint located a far distance away from a mission target. In this manner, the rotor of the ROTARY AV 100 may be driven at a high main rotor speed (Nr) according to a maximum maneuverability Nr schedule so that the ROTARY AV 100 can quickly close in on the target. The mission executor 202, however, may determine that the ROTARY AV 100 is to initiate a stealth mode as the target is approached. Therefore, the mission executor 202 may assign a lower reference Nr to a second waypoint located near the target. When the ROTARY AV 100 reaches the second waypoint, the main rotor speed (Nr) is reduced to according a minimum acoustic detectability schedule to reduce detection of the ROTARY AV 100.

In addition, the ERSM 106 may provide feedback data corresponding to current the flight parameters and current engine speed to the dynamic navigation unit 302. The current flight parameters, engine speed and/or main rotor speed (Nr) are compared to any updated or additional data provided by the mission executor unit 202 to determine whether a new optimal flight path should be selected. During flight, for example, the ROTARY AV 100 may receive a new command from the mission executor unit 202 indicating that the ROTARY AV 100 has been initiated from a standard flight mode into a stealth mode. The stealth mode may indicate that the ROTARY AV 100 is required to operate with minimum acoustic detectability. Accordingly, the mission executor 202 outputs an updated lowered reference Nr and the dynamic navigation unit 302 may select a new optimal flight path that includes increased terrain or obstacles that may reduce visibility of the ROTARY AV 100. The dynamic navigation unit 302 then outputs the reference Nr to the ERSM 106 which can reduce engine speed, thereby reducing the main rotor speed (Nr) to achieve minimum acoustic detectability.

Figure 5:
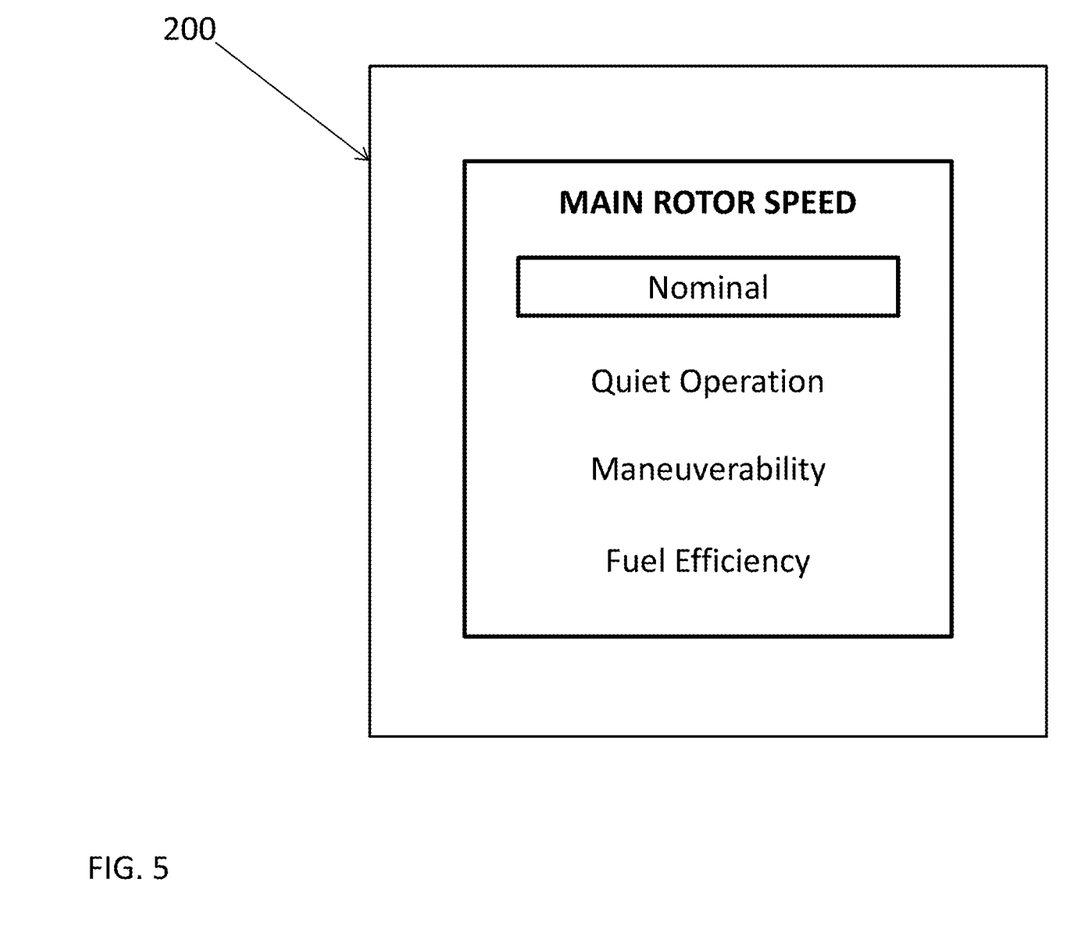
FIG. 5 illustrates a control authority graphic user interface (GUI) configured to provide data inputs to the electronic rotor speed microcontroller according to a non-limiting embodiment.

In addition the GUI 200 is configured as a selectable digital interface to the Nr schedules. An example of a control GUI 200 is illustrated in FIG. 5 according to a non-limiting embodiment. A Nr schedule (e.g., a Nominal Nr schedule) can be selected from among a plurality of different available Nr schedules (Quiet Operation Nr schedule, Maneuverability Nr schedule, Fuel Efficiency Nr schedule) and the current selected Nr schedule (e.g., Nominal Nr Schedule) is displayed accordingly. Although a nominal Nr schedule is illustrated as being selected, it should be appreciated that another Nr schedule can be selected. According to a non-limiting embodiment, if aggressive maneuvering or control limits are encountered, the GUI 200 may switch back to the nominal Nr schedule with an annunciation provided to the pilot. The GUI 200 may also indicate the current command modes and mission modes of the ROTARY AV 100, can be utilized to select a desired command mode and/or mission mode of the ROTARY AV 100.

For example, an operator of the control GUI 200 located remotely from the ROTARY AV 100 can switch the ROTARY AV 100 from the Attitude command mode into the Altitude Hold command mode. Similarly, the operator can switch the ROTARY AV 100 from the Best Range mode into the Loiter mode and/or selectively initiate the Stealth mode. The selection of one or more modes can be achieved using input buttons associated with each command and/or touch screen inputs corresponding to each mode. In response to receiving an input command mode, the control GUI 200 wirelessly communicates the selected modes to the ROTARY AV 100 where it is processed by the mission executor unit 202 as described in detail above. It should be appreciate that the data transmitted by the control GUI 200 can be encrypted according to various well-known encryption algorithms to securely transmit data to the ROTARY AV 100.

Figure 4:
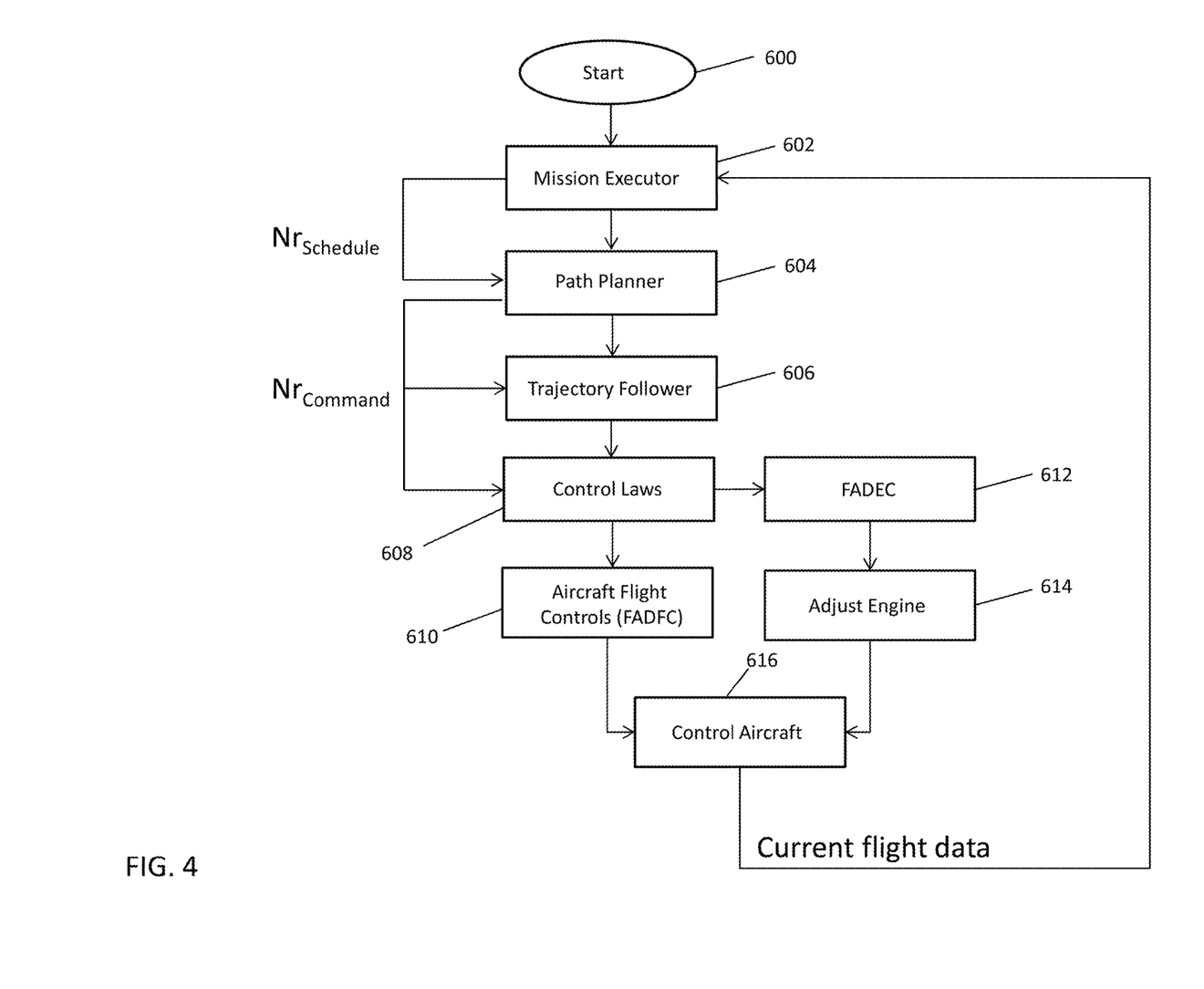
FIG. 4 is a flow diagram illustration a method of autonomously controlling a rotor speed of a rotary AV according to a non-limiting embodiment.

Turning now to FIG. 4, a flow diagram illustrates a method of autonomously controlling a rotor speed of a rotary AV according to a non-limiting embodiment. The method begins at operation 600, and at operation 602 an electronic mission executor unit receives a command mode and/or a mission mode corresponding to the operation of a rotary AV such as, for example, a rotary UAV or rotary OPV. Based on the command mode and/or the mission mode, the mission executor unit determines one or more main rotor speed (Nr) schedules (based on e.g., on a mission objective) and outputs a reference (Nr). At operation 604, a flight path of the rotary AV is determined. The flight path may be based on the Nr and various flight path parameters. According to an embodiment, the Nr schedule can be refined to calculate an Nr sewn into a four-dimensional (4-D) path (i.e., based on space and time). The flight path parameters include, but are not limited to, a current location of the rotary AV, a desired final location of the rotary AV, one or more medial paths between the current location and the final location, the shortest path between the current location and the final location, and various obstacles (e.g., mountains, terrain, woodlands, or buildings) existing between the current location and the desired final location. At operation 606, a trajectory for achieving a mission objection of the rotary AV is determined. More specifically, one or more 3D sample trajectories may be randomly determined based on the generated flight path. A tree of feasible trajectories is then determined, of which a final optimum path is selected.

At operation 608, one or more control laws are determined based on the optimal path and the reference Nr. The control laws include, but are not limited to, Model Following or Dynamic Inversion that manipulate gain schedules or aircraft control power descriptors as a function of aircraft state and main rotor speed. The implementation would provide a set of core inner loop closures that would maintain consistent performance to the trajectory (e.g., available accelerations) following commands despite the manipulation of main rotor speed (Nr) at each instance in time. The calculated control laws are then used to control the flight control parameters at operation 610 and the engine of the rotary AV at operation 612. The flight control parameters include, but are not limited to, pitch, roll, yaw, etc. At each of operations 610 and 612, the flight control parameters and the engine are dynamically controlled while taking into account the reference Nr. Therefore, the reference Nr can be maintained without exceeding operating limitations of the rotary AV. At operation 614, the engine speed is adjusted, such that the rotary AV is according to the optimal flight trajectory and reference Nr. After setting the main rotor speed (Nr) according to the reference Nr at operation 616, current engine output and/or main rotor speed can be fedback to the mission executor at operation 602, and the can determine if the reference Nr requires updating based on additional or changed mission objectives, command modes and/or mission modes.

Accordingly, various embodiments described in detail above provide a rotary AV such as a UAV or OPV, for example, capable of actively controlling the main rotor speed. In this manner, the rotary AV is capable of automatically selecting the most appropriate main rotor speed based on various active parameters including, but not limited to, the desired mission objective, the terrain, and the fuel supply. Moreover, the ability for the rotary AV to vary the rotor speed (Nr) offers a capability to provide quiet operation, increase fuel efficiency, and improve maneuverability.

As described herein, a system and/or server, for example, the system 100, may be described in the general context of computer system executable instructions, such as program modules, being executed by an electronic computer system. Generally, program modules may include routines, programs, objects, components, logic, data structures, and so on that perform particular tasks or implement particular abstract data types. In addition, a computer system and/or server may be practiced in distributed cloud computing environments where tasks are performed by remote processing devices that are linked through a communications network. In a distributed cloud computing environment, program modules may be located in both local and remote computer system storage media including memory storage devices.

Memory/memory units, as described above, may include at least one program product having a set (e.g., at least one) of program modules that are configured to carry out the functions of embodiments of the invention.

Furthermore, programs, functions, applications and tasks may be implemented and executed by one or more having a set (at least one) of program modules. Program modules may include memory that stores, for example, an operating system, one or more application programs, other program modules, and program data. Each of the operating system, one or more application programs, other program modules, and program data or some combination thereof, may include an implementation of a networking environment. Accordingly, the program modules described herein may carry out the functions, applications, tasks, and/or methodologies of the various embodiments described herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotary aerial vehicle (AV) comprising:
   an engine configured to rotate at least one rotor at a variable rotor speed;
   a full authority electronic microcontroller (FAEM) in electrical communication with the engine, the FAEM configured to output at least one electronic engine control signal that controls operation of the engine; and
   an electronic rotor speed microcontroller (ERSM) in electrical communication with the FAEM, the ERSM includes an electronic mission executor unit configured to dynamically determine at least one mission objective of the rotary AV in response to at least one selected operating mode of the rotary AV and to output an electronic rotor speed control signal that commands the FAEM to adjust the rotor speed of the at least one rotor, wherein the electronic mission executor unit stores at least one rotor speed schedule that corresponds to the determined mission objective, and selects the at least one rotor speed schedule in response to determining the mission objective.

2. The rotary AV of claim 1, wherein the aerial AV is one of an unmanned aerial vehicle (UAV) or an optionally piloted vehicle (OPV), and wherein the at least one selected operating mode includes an altitude command mode, and altitude command hold mode, a best range mode, a loiter mode, a stealth mode, an aggressive max-speed mode, and a minimum fuel consumption mode.

3. The rotary AV of claim 1, wherein the electronic mission executor unit calculates a reference rotor speed based on the at least one selected rotor speed schedule.

4. The rotary AV of claim 3, wherein the electronic rotor speed control signal indicates the reference rotor speed, and the FAEM commands the engine to rotate the at least one rotor at the reference rotor speed in response to receiving the electronic rotor speed control signal.

5. The rotary AV of claim 4, wherein the ERSM further includes an electronic dynamic navigation unit in electrical communication with the electronic mission executor unit, wherein the dynamic navigation unit is configured to generate a flight path of the rotary AV, and wherein the mission executor is configured to calculate at least one reference rotor speed based on the flight path.

6. A method of controlling a rotor speed of rotary aerial vehicle (AV), the method comprising:
   rotating at least one rotor at a variable rotor speed;
   outputting at least one electronic engine control signal that controls operation of the engine;
   dynamically determining at least one mission objective of the rotary AV and outputting an electronic rotor speed control signal that adjusts the rotor speed of the at least one rotor; and
   storing in an electronic memory unit at least one rotor speed schedule that corresponds to the determined mission objective, and selecting the at least one rotor speed schedule in response to determining the mission objective.

7. The method of claim 6, further comprising determining a mission objective in response to at least one selected operating mode of the rotary AV.

8. The method of claim 7, wherein the aerial AV is one of a unmanned aerial vehicle (UAV) or an optionally piloted vehicle (OPV), and wherein the at least one selected operating mode includes a an altitude command mode, and altitude command hold mode, a best range mode, a loiter mode, a stealth mode, an aggressive max-speed mode, and a minimum fuel consumption mode.

9. The method of claim 6, further comprising calculating a reference rotor speed based on the at least one selected rotor speed schedule.

10. The method of claim 9, wherein the electronic rotor speed control signal indicates the reference rotor speed, and commanding the engine to rotate the at least one rotor at the reference rotor speed based on the electronic rotor speed control signal.

11. The method of claim 10, further comprising generating a flight path of the rotary AV, and calculating at least one reference rotor speed based on the flight path.

12. The method of claim 11, further comprising assigning the at least one reference rotor speed to at least one way point included in the flight path, wherein the rotary AV autonomously changes a rotor speed from a first rotor speed to a second rotor speed that matches the reference rotor speed in response to reaching that at least one waypoint.

* * * * *